US008075131B2

(12) United States Patent
Kusmec-Aguilar

(10) Patent No.: US 8,075,131 B2
(45) Date of Patent: Dec. 13, 2011

(54) VIEWING DEVICE FOR SIMULATING IMPAIRMENT AND REDUCING PERIPHERAL VISION

(75) Inventor: Debra C. Kusmec-Aguilar, Verona, WI (US)

(73) Assignee: Innocorp, Ltd, Verona, WI (US)

( * ) Notice: Subject to any disclaimer, the term of this patent is extended or adjusted under 35 U.S.C. 154(b) by 0 days.

(21) Appl. No.: 12/702,681

(22) Filed: Feb. 9, 2010

(65) Prior Publication Data

US 2010/0259716 A1 Oct. 14, 2010

Related U.S. Application Data

(60) Provisional application No. 61/150,956, filed on Feb. 9, 2009.

(51) Int. Cl.
*G02C 7/16* (2006.01)

(52) U.S. Cl. .......................................... 351/46; 351/45

(58) Field of Classification Search .................... 351/45, 351/46, 53, 47, 44, 41, 158
See application file for complete search history.

(56) References Cited

U.S. PATENT DOCUMENTS

| | | | | |
|---|---|---|---|---|
| 1,643,509 | A * | 9/1927 | Moran | 351/45 |
| 4,229,082 | A * | 10/1980 | Carreau et al. | 351/44 |
| 4,522,474 | A | 6/1985 | Slavin | |
| 4,898,459 | A * | 2/1990 | Eriksson | 351/46 |
| 5,362,238 | A | 11/1994 | Slavin | |
| 6,206,521 | B1 | 3/2001 | Kindschuh | |
| 6,942,336 | B2 * | 9/2005 | Foulke et al. | 351/45 |
| 2005/0036110 | A1 | 2/2005 | Aguilar et al. | |

* cited by examiner

*Primary Examiner* — Hung Dang
(74) *Attorney, Agent, or Firm* — Quarles & Brady LLP

(57) ABSTRACT

A peripheral vision reducing apparatus for simulating a visual effect of intoxication is disclosed. The apparatus has at least one aperture configured to be disposed in the middle of a wearer's visual field. The aperture is also configured to permit a first amount of light to pass therethrough. The apparatus further comprises at least one filter surrounding the at least one aperture. The at least one filter is configured to be disposed at the periphery of a wearer's visual field. The at least one filter is also configured to permit a second amount of light to pass therethrough, and the second amount of light is less than the first amount of light.

9 Claims, 4 Drawing Sheets

50 48 4 4 50 30 44 32 40 34 38 46 44 36 42 16 18 18 16 24 14 24 12

VIEWING DEVICE FOR SIMULATING IMPAIRMENT AND REDUCING PERIPHERAL VISION

CROSS-REFERENCE TO RELATED APPLICATION

The application claims the benefit of U.S. Provisional Application No. 61/150,956 filed on Feb. 9, 2009 which is incorporated herein by reference as if set forth in its entirety.

STATEMENT REGARDING FEDERALLY SPONSORED RESEARCH OR DEVELOPMENT

Not applicable.

BACKGROUND OF THE INVENTION

The present invention relates to a viewing device that impairs a wearer's visual faculties thereby simulating the impairing effect of an intoxicant. In particular, the invention, which is compatible with existing viewing devices that simulate impairment, subtly restricts the wearer's peripheral vision. The invention also simulates reduced peripheral vision associated with other conditions and situations such as drowsiness and excessive driving speed.

Substantial effort is undertaken by educators, law enforcement personnel, safety promoting organizations, and the like to convince people, particularly young people, of the hazards associated with being under the influence of intoxicants such as alcohol, legal, and illegal drugs. Impairment has particular ramifications in many situations, including simple tasks such as walking to more complex tasks such as operating a motor vehicle. It is particularly challenging to provide a meaningful firsthand experience of the impairing effects of an intoxicant, insofar as one typically cannot induce impairment in a subject with the intoxicant and, even if one could, it would be improper to then ask the subject to operate a motor vehicle while impaired.

Therefore devices that simulate the effects of impairment on a subject under the influence of an intoxicant are frequently employed in safety education programs and in other settings. FATAL VISION goggles (Innocorp, Ltd., Verona, Wis.) include one or more vision-distorting Fresnel lenses in the wearer's field of view. Inncorp, Ltd. has developed and marketed various models of such goggles which simulate various levels of impairment (i.e., blood alcohol concentration) and various conditions (e.g., day or night), for use in safety education programs.

Law enforcement officials understand that when blood alcohol concentration is very high, intoxicated individuals exhibit markedly reduced peripheral vision. This phenomenon, commonly referred to as tunnel vision, may go unappreciated by the intoxicated individual. What is therefore desired in the art is a viewing device that simulates reduced peripheral vision of a subject under the influence of an intoxicant or having another peripheral vision-reducing condition that can readily be employed in a controlled setting so as to not put the subject at risk. It is also desirable to provide a viewing device that can be used with other devices to effectively simulate other effects of intoxication, such as distorted vision.

SUMMARY OF THE INVENTION

In one aspect, the present invention provides a peripheral vision reducing apparatus for simulating reduced peripheral vision that can characterize an effect of high blood alcohol concentration. The apparatus attaches, e.g., statically or adhesively, to a front panel of existing impairment-simulating eyewear (such as the FATAL VISION goggles) and includes a light filter portion positioned around the periphery of the Fresnel lens that is itself positioned in use in the visual field of a wearer. The light filter portion can be substantially annular or ovoid. For each eye, the peripheral light filter defines at least one aperture in the middle of a user's visual field through which a first amount of light can pass. The light filter portions are also configured to permit a second amount of light to pass therethrough, the second amount of light being less than the first amount of light. The amount of light that passes through the aperture and through the filter portion can be selected to provide a desired effect. For example, as the amount of light that passes through the filter portions is reduced, the reduction of peripheral vision is increased.

In another aspect, the present invention is summarized as impairment-simulating eyewear having affixed thereto a peripheral vision reducing apparatus of the type described above. The peripheral vision reducing apparatus can be sold separately from the impairment-simulating eyewear, or as a kit containing both parts. The eyewear includes at least one front panel and at least one lens. The at least one lens includes a filter configured to limit an amount of light passing there through to reduce peripheral vision of a user.

The foregoing and other advantages of the invention will appear in the detailed description that follows. In the description, reference is made to the accompanying drawings that illustrate a preferred embodiment of the invention.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
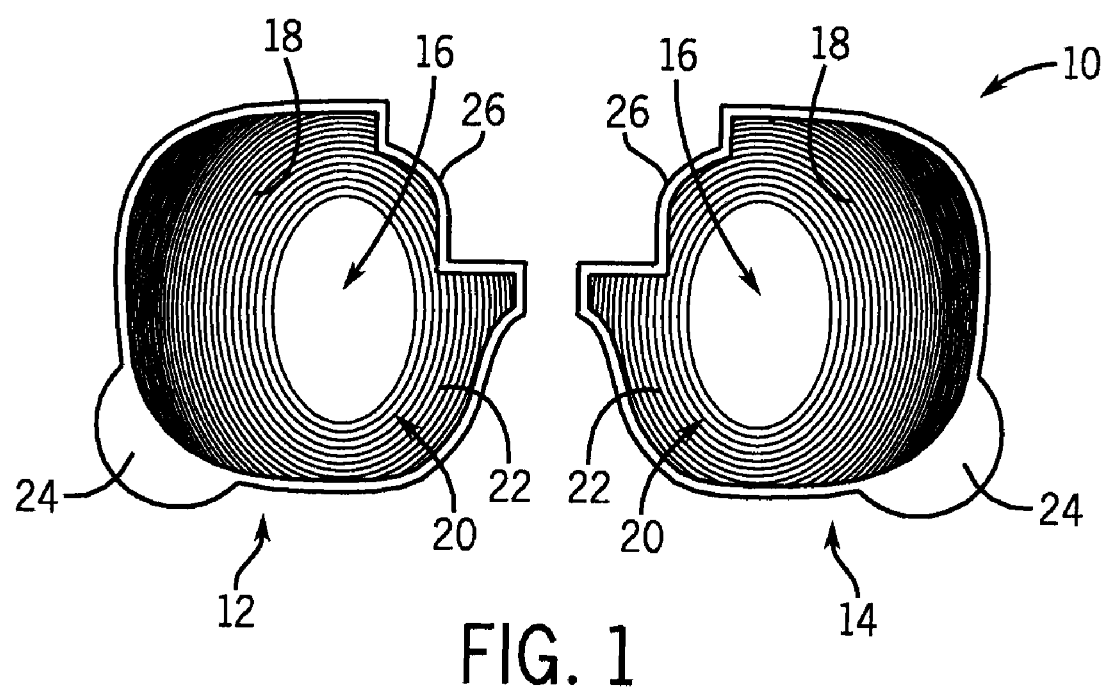
FIG. 1 is a front view of a peripheral vision reducing apparatus of the present invention.

Referring to FIG. 1, a peripheral vision reducing apparatus 10 of the present invention includes one or more vision reducing portions, such as right eye and left eye vision reducing portions 12 and 14. However, the apparatus 10 may also include a single portion 12 or 14, or the right eye and left eye portions 12 and 14 may be connected without departing from the scope of the invention. In a preferred embodiment, each portion 12 and 14 is a thin, flexible polymeric material, although other materials may also be used.

Still referring to FIG. 1, each portion 12 and 14 includes a light filter 18 for reducing the peripheral vision of a wearer and simulating "tunnel vision" associated with various conditions and situations, as noted. The light filter defines an aperture 16 that may be either an opening in the portion 12 or 14 or a transparent section of the portion 12 or 14 that permits a wearer to see clearly therethrough. The aperture 16 preferably has a vertically oriented oval or elliptical shape to closely simulate the visual field of the wearer. The light filter 18 includes a plurality of darkly colored or otherwise opaque curved bands 20 that, in a preferred embodiment, have the same oval or elliptical shape as the aperture 16, but are larger than the aperture 16. Semi-translucent bands 22 are disposed between pairs of opaque bands 20. The term "semi-translucent" should be understood to mean that some light to passes there through such that the user sees a blurred image. In combination, the opaque and semi-translucent bands 20 and 22 provide a blurred and more dimly lit view through the filter 18 compared to the view through the aperture 16.

The aperture 16 and the filter 18 provide the user with a view in which the wearer's visual field looking forward is less blurry than the visual field at the periphery, which also simulates tunnel vision by permitting less light through at the periphery. In addition and as shown in the figures, the width of the opaque bands 20 may increase progressively proceeding away from the aperture 16 to gradually reduce the user's peripheral vision proceeding away from the middle of the visual field. That is, areas of the filter 18 near the aperture 16 may permit a greater amount of light to pass therethrough compared to areas of the filter 18 farther from the aperture 16 to better simulate tunnel vision.

Each or both of portions 12 and 14 can include a tab 24 for easy removal of the portions 12 and 14 from a sheet (not shown) on which the portions 12 and 14 can be provided to the user. An outer edge 26 of each portion 12 and 14 may be shaped to fit in a frame of an impairment-simulating eyewear device, as described below. In addition, the back surface of each portion 12 and 14 is configured to adhesively, statically, or otherwise be affixed, using materials and methods known to those skilled in the art, to the frame or a front panel of the impairment-simulating eyewear.

Figure 2:
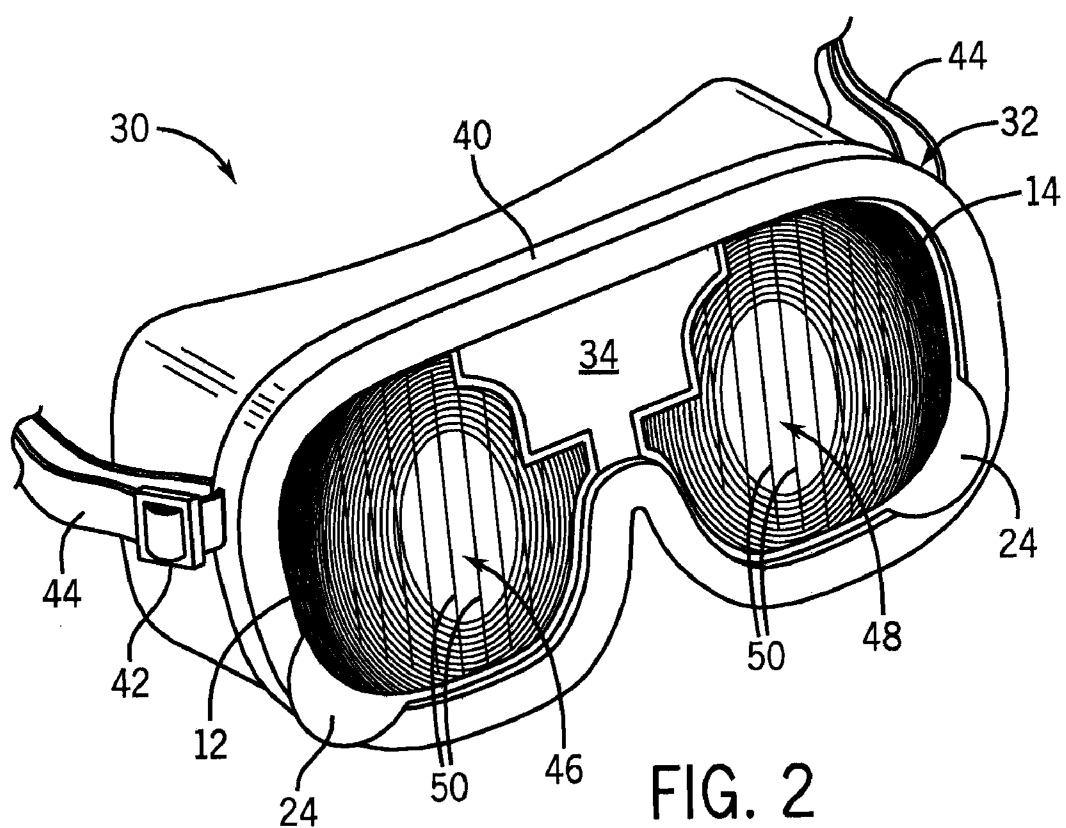
FIG. 2 is a perspective view of the peripheral vision reducing apparatus of FIG. 1 supported by impairment-simulating eyewear.
Figure 3:
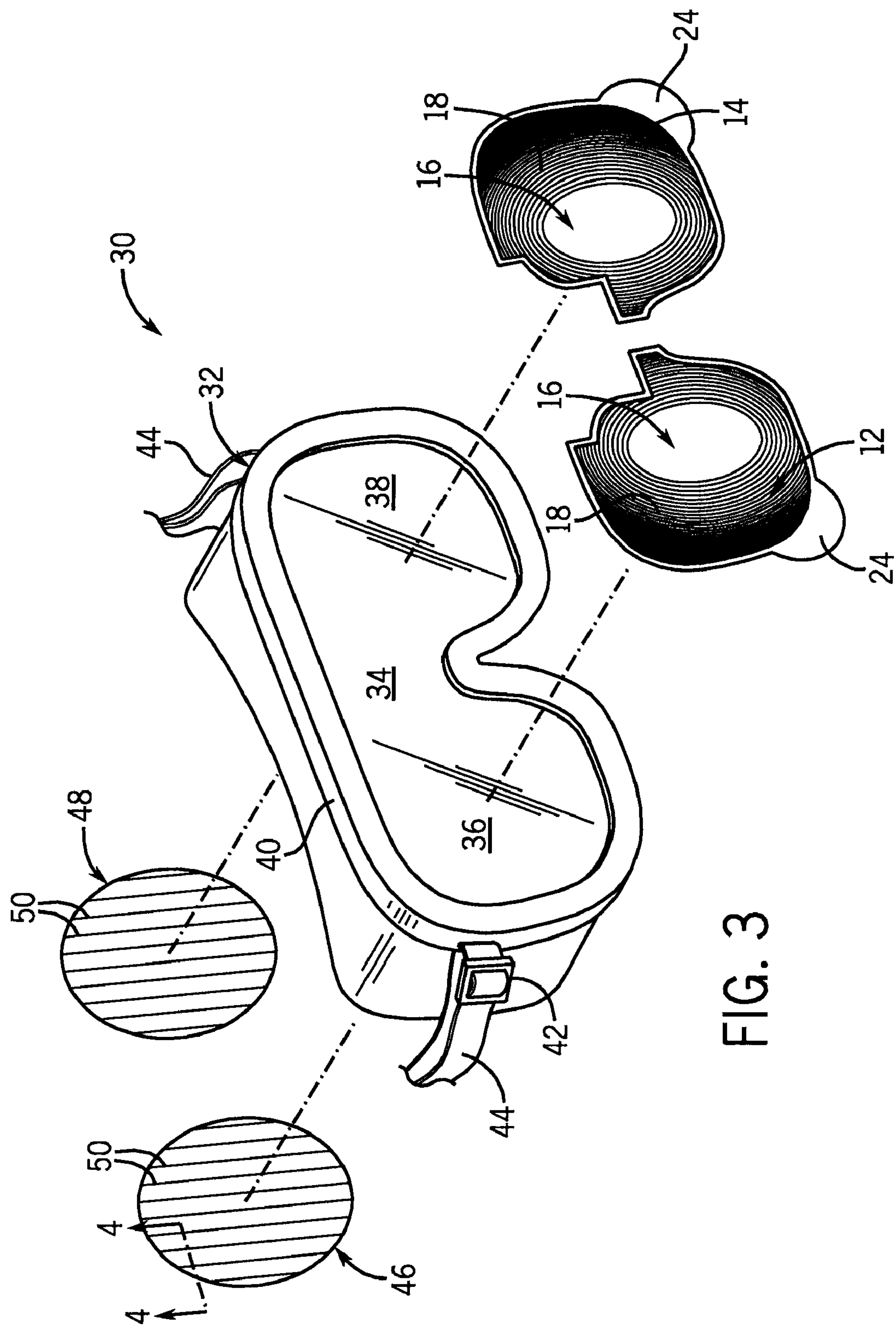
FIG. 3 is an exploded perspective view of the impairment-simulating eyewear of FIG. 2.

Referring now to FIGS. 2 and 3, the peripheral vision reducing apparatus 10 is preferably used with impairment-simulating eyewear 30 that is worn on the user's face. The eyewear 30 includes an article of eyewear, such as a set of goggles 32, that may be made from a combination of suitable plastic or composite materials. The goggles 32 include a translucent front panel 34 having right and left segments 36 and 38 that support peripheral vision reducing portions 12 and 14, respectively. A frame 40 supports the front panel 34 and is shaped to engage the user's face and preferably provides a seal against the user's face. The frame 40 may be slightly separated from an inside surface of the front panel 34 to provide a slot (not shown) for one or more additional lenses. Flanges 42 extend from the frame 40 and receive a flexible strap 44 that is sized to wrap around the head of the user to affix the goggles 32 to the user's face.

Still referring to FIGS. 2 and 3, the viewing impairment device 30 preferably includes one or more vision distorting segments, such as right eye and left eye vision distorting segments 46 and 48. Alternatively, the device 30 may also include a single segment 46 or 48 or the right eye and left eye segments 46 and 48 may be connected. As shown in the figures, the vision distorting segments 46 and 48 are supported inside the frame 40 opposite the vision reducing segments 12 and 16, respectively. The segments 46 and 48 may be supported, for example, in the slot formed between the front panel 34 and the frame 40.

Figure 4:
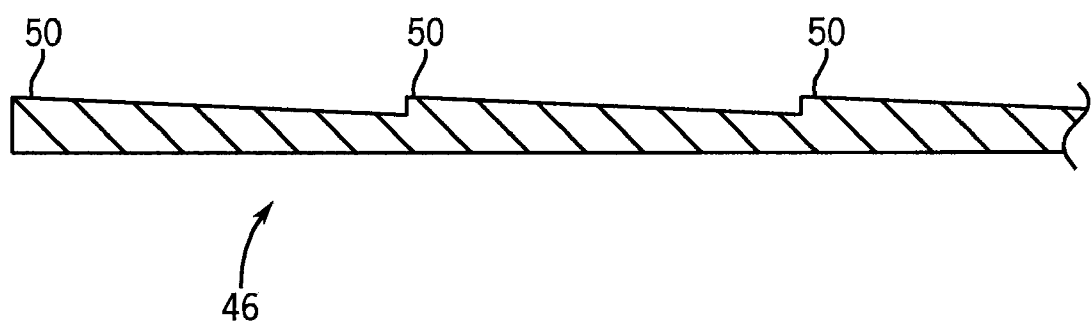
FIG. 4 is a sectional view of the impairment-simulating eyewear along line 4-4 of FIG. 3.

Referring now to FIGS. 2-4, the vision distorting segments 46 and 48 may be Fresnel lens. As such, the segments 46 and 48 may be made of a flat, plastic transparent sheet, but can also be made of any suitable transparent material. In addition, the segments 46 and 48 may each have a plurality of protrusions 50 that are triangular in cross-section and distort an image when viewed through the segments 46 and 48. The protrusions 50 preferably extend vertically relative to the user's field of view, although other orientations may also be used without departing from the scope of the invention.

The viewing impairment device 30 advantageously distorts the user's visual field and reduces the user's peripheral vision, thereby closely simulating the effects of tunnel vision. In educational and other appropriate settings, the peripheral vision reducing device 10 and the viewing impairment device 30 may be used in activities that evidence the impact of reduced peripheral vision on simple and complex tasks.

It is specifically intended that the present invention not be limited to the embodiments and illustrations contained herein, but include modified forms of those embodiments including portions of the embodiments and combinations of elements of different embodiments as come within the scope of the following claims.

I claim:

1. An apparatus for simulating a condition characterized by reduced peripheral vision, comprising:

at least one filter comprising a plurality of opaque bands, pairs of opaque bands being separated by semi-translucent bands, the filter defining an aperture therethrough, the filter passing sufficiently less light therethrough than through the aperture to simulate reduced-peripheral vision, the filter being adapted to engage a front panel of impairment-simulating eyewear and being configured to be disposed at the periphery of a wearer's visual field.

2. The apparatus of claim 1 having a surface configured for affixation to an article of impairment-simulating eyewear.

3. The apparatus of claim 2, wherein the surface is configured for adhesive or static engagement to the eyewear.

4. The apparatus of claim 1, further comprising the impairment simulating eyewear having the front panel, the at least one filter being engaged to the front panel.

5. The apparatus of claim 1 wherein the opaque bands each have a width, and the width of the opaque bands increases proceeding away from the aperture.

6. Eyewear for simulating a condition characterized by reduced peripheral vision, comprising:

an article of impairment-simulating eyewear comprising at least one front panel; and at least one filter adapted to engage the front panel, the filter being configured to be disposed at the periphery of a wearer's visual field, the at least one filter defining an aperture therethrough, the filter passing sufficiently less light therethrough than through the aperture to simulate reduced-peripheral vision and including a plurality of opaque bands, pairs of opaque bands being separated by semi-translucent bands.

7. The eyewear of claim 6, wherein the filter comprises a surface configured for affixation to the front panel.

8. The eyewear of claim 7, wherein the surface is configured for adhesive or static affixation to the front panel.

9. The eyewear of claim 6, wherein the opaque bands each have a width, and the width of the opaque bands increases proceeding away from the aperture.

* * * * *